United States Patent
Kwon et al.

(10) Patent No.: US 7,328,615 B2
(45) Date of Patent: Feb. 12, 2008

(54) METHOD AND APPARATUS FOR DETECTING FREE FALL OF ELECTRONIC DEVICE

(75) Inventors: Woong Kwon, Seongnam-si (KR); Kyung-shik Roh, Seongnam-si (KR); Woo-sup Han, Yongin-si (KR); Young-bo Shim, Seoul (KR); Sang-min Suh, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 11/236,595

(22) Filed: Sep. 28, 2005

(65) Prior Publication Data

US 2006/0070439 A1 Apr. 6, 2006

(30) Foreign Application Priority Data

Oct. 2, 2004 (KR) .................. 10-2004-0078545

(51) Int. Cl.
*G01P 15/00* (2006.01)

(52) U.S. Cl. ............... 73/488; 73/514.01; 702/104; 702/141

(58) Field of Classification Search ............ 73/514.01, 73/488; 702/104, 141
See application file for complete search history.

(56) References Cited

U.S. PATENT DOCUMENTS

| 4,745,564 | A | * | 5/1988 | Tennes et al. ............... 702/141 |
| 5,521,772 | A | * | 5/1996 | Lee et al. ..................... 360/75 |
| RE35,269 | E | * | 6/1996 | Comerford ................... 360/75 |
| 5,777,225 | A | * | 7/1998 | Sada et al. .................... 73/488 |
| 5,777,815 | A | * | 7/1998 | Kasiraj et al. ................ 360/75 |
| 5,982,573 | A | * | 11/1999 | Henze ........................ 360/75 |
| 6,018,431 | A | * | 1/2000 | Carlson et al. ............... 360/60 |
| 6,046,871 | A | * | 4/2000 | Schaenzer et al. ............ 360/31 |
| 6,236,527 | B1 | * | 5/2001 | Uchiike et al. ............... 360/75 |
| 6,415,189 | B1 | * | 7/2002 | Hajji ........................... 700/79 |

(Continued)

FOREIGN PATENT DOCUMENTS

EP 0 658 894 A1 6/1995

(Continued)

OTHER PUBLICATIONS

European Search Report dated Sep. 5, 2006.

*Primary Examiner*—Hezron Williams
*Assistant Examiner*—Samir M. Shah
(74) *Attorney, Agent, or Firm*—Sughrue Mion, PLLC

(57) ABSTRACT

A method and apparatus for detecting a free fall of an electronic device. The method includes: sensing a falling acceleration of the electronic device using an acceleration sensor; determining whether the sensed falling acceleration is less than a predetermined threshold; when the sensed falling acceleration is less than the predetermined threshold, determining whether the falling acceleration is a statistical constant, which has a statistical significance, and is maintained for a predetermined time; and when the falling acceleration is a statistical constant and maintained for a predetermined time, determining that the electronic device falls freely. Accordingly, it is possible to exactly detect a free fall of an electronic device, irrespective of an error of the acceleration of gravity generated when a falling acceleration of the electronic device is measured, due to ambient conditions, e.g., a temperature change and a rotation acceleration generated when the electronic device rotates.

14 Claims, 7 Drawing Sheets

U.S. PATENT DOCUMENTS

| | | |
|---|---|---|
| 6,429,990 B2 * | 8/2002 | Serrano et al. ............... 360/60 |
| 6,612,157 B2 * | 9/2003 | Urano et al. ............... 73/65.01 |
| 6,714,371 B1 * | 3/2004 | Codilian ...................... 360/60 |
| 6,735,033 B1 * | 5/2004 | Codilian et al. .............. 360/60 |
| 2002/0027733 A1 * | 3/2002 | Kikuta et al. ................. 360/60 |
| 2003/0067705 A1 * | 4/2003 | Ishiyama et al. ............. 360/75 |
| 2003/0128475 A1 * | 7/2003 | Wehrenberg ............... 360/250 |
| 2004/0125493 A1 | 7/2004 | Shimotono et al. |
| 2004/0190187 A1 * | 9/2004 | Kisaka et al ................. 360/75 |
| 2004/0240098 A1 * | 12/2004 | Ito et al. ....................... 360/75 |
| 2006/0031015 A1 * | 2/2006 | Paradie ....................... 701/301 |
| 2006/0116848 A1 * | 6/2006 | Clifford et al. ............. 702/141 |
| 2006/0150731 A1 * | 7/2006 | Fontanella et al. ........... 73/488 |

FOREIGN PATENT DOCUMENTS

| | | | |
|---|---|---|---|
| EP | 658894 A1 * | 6/1995 | |
| JP | 2000241442 A | 2/1999 | |

* cited by examiner

ACCELERATION SENSOR

METHOD AND APPARATUS FOR DETECTING FREE FALL OF ELECTRONIC DEVICE

CROSS-REFERENCE TO RELATED PATENT APPLICATIONS

This application claims the priority of Korean Patent Application No. 10-2004-78545, filed on Oct. 2, 2004, in the Korean Intellectual Property Office, the disclosure of which is incorporated herein in its entirety by reference.

BACKGROUND OF THE INVENTION

1. Field of the Invention

The present invention relates to a hand-held electronic device, such as a mobile phone, a personal digital assistant (PDA), and a digital camera, a household electronic device, or an office electronic device, and more particularly, to an apparatus and method for detecting the free fall of an electronic device to make an internal program (or circuit) of the electronic device enter a safe mode when the electronic device is falling to the ground, thereby preventing damage to the electronic device.

2. Description of the Related Art

In a conventional method and apparatus for detecting the free fall of an electronic device and preventing physical damage to the electronic device due to the shock, a protecting routine against shock is activated when the falling acceleration of the electronic device is sensed and the sensed falling acceleration, which is equal to the reference acceleration of gravity (9.8 m/s$^2$) when the falling begins, is gradually reduced to a positive threshold near 0 and is maintained under that threshold for a predetermined time.

An acceleration sensor, which senses the acceleration of an electronic device, may erroneously determine the reference acceleration of gravity to be greater than 9.8 m/s$^2$ due to a change in internal parameters of the acceleration sensor, or a drift caused by ambient conditions, e.g., a temperature change or a lapse of time. In this case, although the actual falling acceleration of the electronic device is maintained under the threshold for the predetermined time, the acceleration sensor erroneously determines that the falling acceleration is not reduced under the threshold and thus cannot detect the free fall of the electronic device.

FIG. 1 is a graph illustrating a problem of a conventional method of detecting the free fall of an electronic device. Referring to FIG. 1, when an acceleration sensor erroneously senses reference acceleration of gravity to be greater than 9.8 m/s$^2$, an error between the reference acceleration of gravity and the sensed acceleration of gravity is generated, the acceleration sensor determines that the falling acceleration of the electronic device is not reduced to a predetermined threshold $a_{th}$ or less, and thus cannot sense the free fall of the electronic device.

Further, since the predetermined threshold is determined to be approximately equal to 0, the acceleration sensor determines that the electronic device fall freely only when the falling acceleration is approximately equal to 0. Accordingly, the acceleration sensor cannot sense the free fall when the moving direction of the electronic device during a free fall is changed and the falling acceleration is not approximately equal to 0 due to the rotation acceleration of the electronic device.

FIG. 2 is a graph illustrating another problem of the conventional method of detecting the free fall of an electronic device. Referring to FIG. 2, when the electronic device falls freely while rotating and the rotation acceleration of the electronic device is equal to or greater than a predetermined value, the free fall of the electronic device is not sensed since a threshold $a_{th}$ is an approximately equal to 0.

When the falling acceleration of the electronic device temporarily exceeds a threshold within a predetermined length of time due to noise in the acceleration sensor, the length of time that the falling acceleration is maintained is less than the predetermined length of time. Thus, although the electronic device falls freely, the free fall of the electronic device is not detected since the falling acceleration is considered as not being maintained for the predetermined length of time.

FIG. 3 is a graph illustrating yet another problem of the conventional method of detecting the free fall of an electronic device. Referring to FIG. 3, when the falling acceleration of the electronic device is temporarily greater than a threshold $a_{th}$ within a predetermined length of time $T_{th}$ due to noise in an acceleration sensor, the length of time $T_f$ for which the falling acceleration is maintained smaller than the threshold $a_{th}$ is less than the predetermined length of time $T_{th}$. Therefore, the length of time when the falling acceleration is maintained is initialized to 0, thereby preventing the free fall of the electronic device from being detected.

SUMMARY OF THE INVENTION

An exemplary embodiment of the present invention provides an error-free method of detecting a free fall of an electronic device.

An exemplary embodiment of the present invention also provides an error-free apparatus for detecting a free fall of an electronic device.

According to one exemplary embodiment of the present invention, there is provided a method of detecting a free fall of an electronic device, the method including: sensing a falling acceleration of the electronic device using an acceleration sensor; determining whether the sensed falling acceleration is less than a predetermined threshold; when the sensed falling acceleration is less than the predetermined threshold, determining whether the falling acceleration is a statistical constant, which has a statistical significance, and is maintained for a predetermined time; and when the falling acceleration is a statistical constant and maintained for a predetermined time, determining that the electronic device falls freely.

According to another exemplary embodiment of the present invention, there is provided an apparatus of detecting a free fall of an electronic device, the apparatus including: an acceleration sensor sensing a falling acceleration of the electronic device; an acceleration comparator comparing whether the falling acceleration is less than a predetermined threshold; an acceleration change determining unit determining whether the falling acceleration is a statistical constant, which has a statistical significance, and is maintained for a predetermined time, according to the result of comparing transmitted from the acceleration comparator; and a free fall determining unit determining that the electronic device falls freely according to the result of determination transmitted from the acceleration change determining unit.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE INVENTION

A method of detecting a free fall of an electronic device according to an exemplary embodiment of the present invention will now be described with reference to the accompanying drawings.

Figure 1:
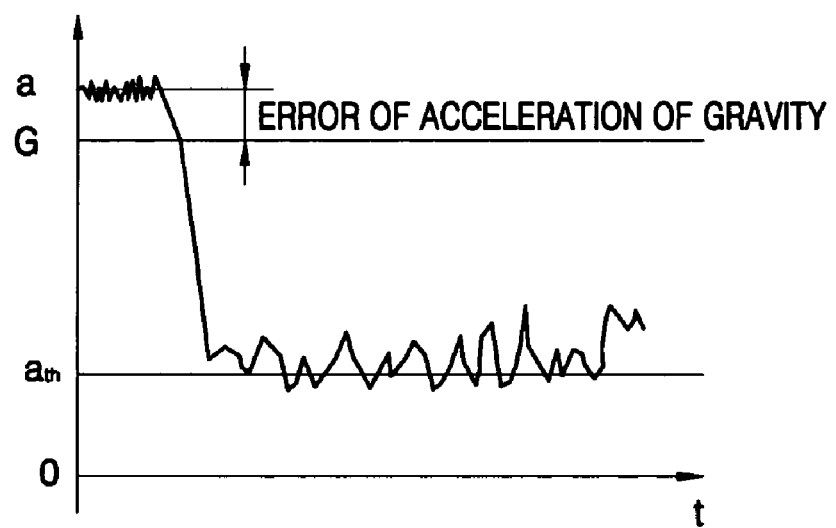
FIG. 1 is a graph illustrating one problem of a conventional method of detecting a free fall of an electronic device.
Figure 2:
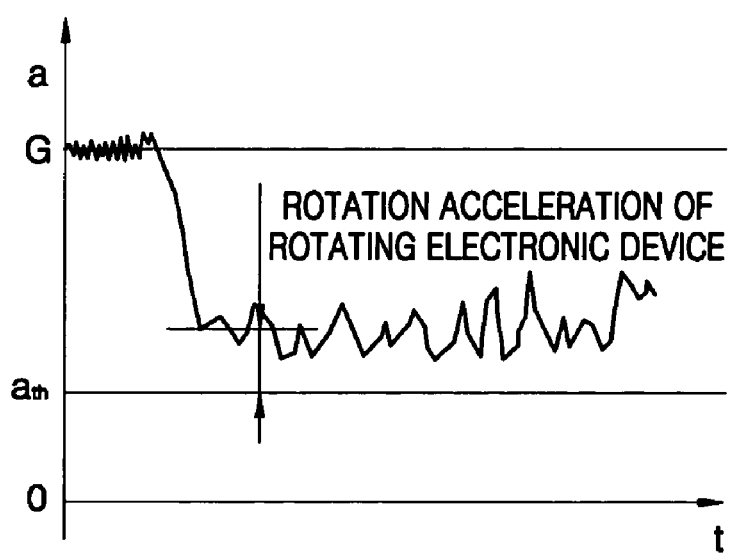
FIG. 2 is a graph illustrating another problem of the conventional method of detecting a free fall of an electronic device.
Figure 3:
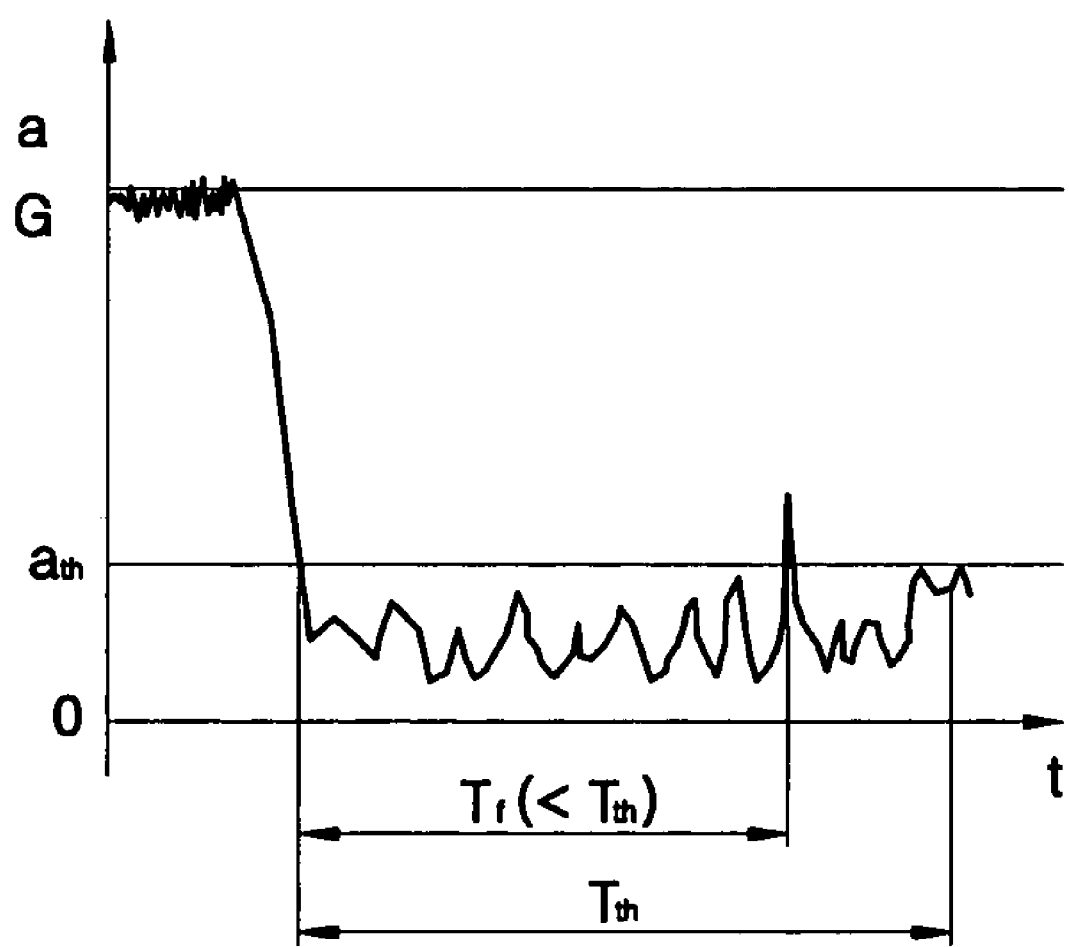
FIG. 3 is a graph illustrating yet another problem of a conventional method of detecting a free fall of an electronic device.
Figure 4:
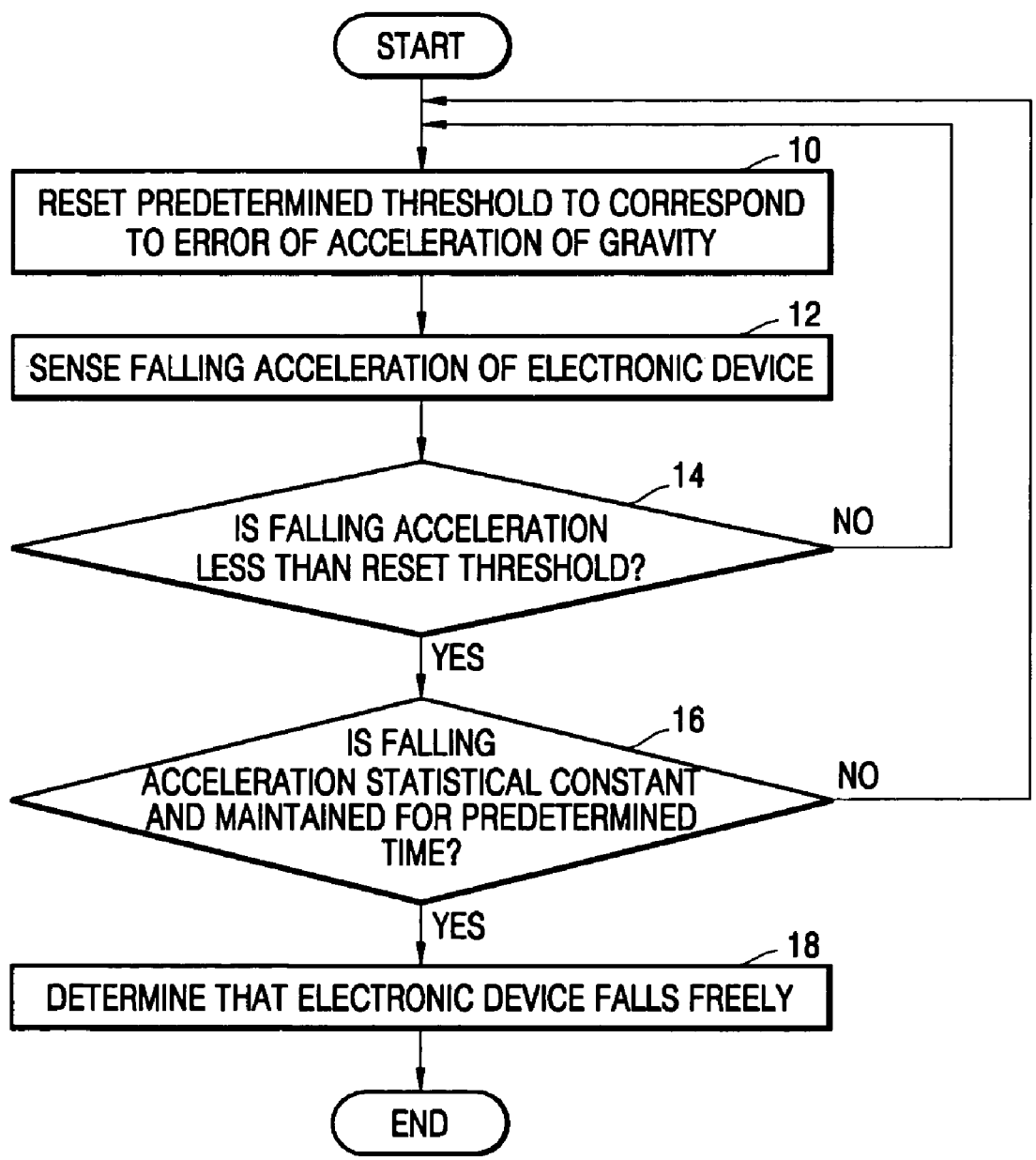
FIG. 4 is a flowchart of a method of detecting a free fall of an electronic device according to an exemplary embodiment of the present invention.

FIG. 4 is a flowchart of a method of detecting a free fall of an electronic device according to an exemplary embodiment of the present invention. Referring to FIG. 4, a predetermined threshold is reset in accordance with an error between the reference acceleration of gravity and the sensed acceleration of gravity (operation 10).

The predetermined threshold has been computed before performing operation 10. The predetermined threshold is determined by compensating for the error between the reference acceleration of gravity and the sensed acceleration of gravity, and the rotation acceleration of the electronic device when the electronic device rotates. That is, the predetermined threshold is determined based on facts that the error between the reference acceleration of gravity and the sensed acceleration of gravity is caused when the sensed acceleration of gravity is greater than 9.8 m/s$^2$ due to a temperature change, a lapse of time, or a change in internal parameters of an acceleration sensor, and that the rotation acceleration is generated when the electronic device falls freely.

For instance, the sensed acceleration of gravity may be 0.2 times greater than 9.8 m/s$^2$ due to a temperature change or a change in internal parameters of the acceleration sensor. That is, an error of the acceleration of gravity of 0.2*9.8 m/s$^2$ may be obtained.

Figure 5:
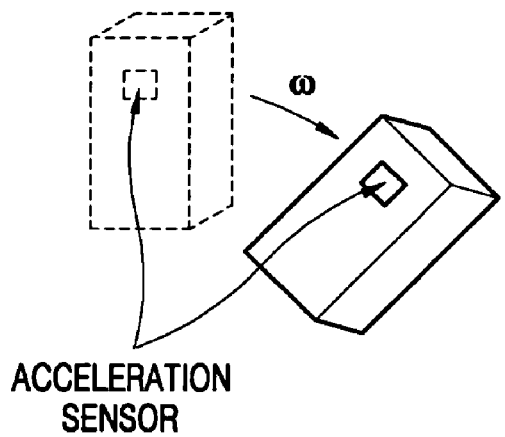
FIG. 5 is a diagram explaining the rotation acceleration of an electronic device, caused by the rotation of the electronic device.

FIG. 5 is a diagram illustrating the rotation acceleration of an electronic device generated when the electronic device rotates. When the electronic device falls freely while rotating, the falling acceleration of the electronic device is increased, thereby preventing the free fall of the electronic device from not being detected. Referring to FIG. 5, when an acceleration sensor is not positioned on a rotation axis of the device, the acceleration sensor senses the rotation acceleration ω of the electronic device. The acceleration of the electronic device sensed by the acceleration sensor is given by:

$$\alpha_A = \alpha_P + \omega'^* r + \overline{\omega}^*(\overline{\omega}^* r) \quad (1),$$

wherein $\alpha_A$ denotes the acceleration of the electronic device sensed by the acceleration sensor, $\alpha_P$ denotes the acceleration of the electronic device from which the rotation acceleration ω is excluded, and r denotes the distance between the rotating axis and the acceleration sensor.

If the number of times that the electronic device rotates is 1 and the rotation radius is 6 cm, the rotation acceleration of 0.2415*9.8 m/s$^2$ is obtained by Equation (1). The present invention is not limited to the above description, that is, the rotation acceleration may be computed using values other than the number of times that the electronic device rotates and the rotation radius. In this embodiment, it is assumed that the rotation acceleration is roughly determined to be 0.3*9.8 m/s$^2$. The predetermined threshold is preferably determined to be 0.5*9.8 m/s$^2$ so as to exactly sense the free fall of the electronic device irrespective of the error between the reference acceleration of gravity and the sensed acceleration of the electronic device and the rotation acceleration.

As previously described, the predetermined threshold has been computed in consideration of the error between the reference acceleration of gravity and the sensed acceleration of gravity and the rotation acceleration before operation 10. In operation 10, the predetermined threshold is reset every time when the error between the reference acceleration of gravity and the sensed acceleration of the electronic device is generated.

In operation 10, an error between the reference acceleration of gravity and the sensed acceleration of gravity generated due to a temperature change or a change in internal parameters of the acceleration sensor is reflected in real time in resetting the predetermined threshold. However, an error between the reference acceleration of gravity and the sensed acceleration of gravity due to the rotation acceleration is not reflected.

Figure 6:
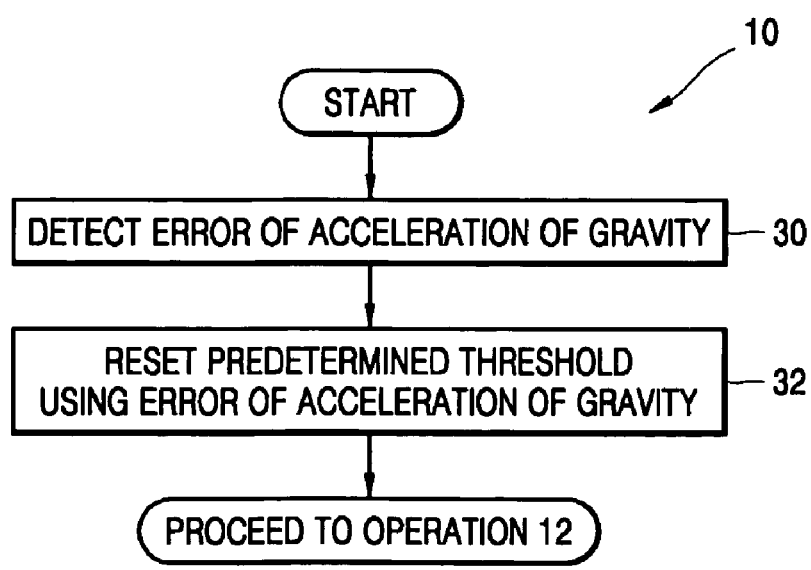
FIG. 6 is a detailed flowchart of operation 10 of FIG. 4.

FIG. 6 is a detailed flowchart of operation 10 of FIG. 4. Referring to FIG. 6, the error between the reference acceleration of gravity and the sensed acceleration of gravity is detected (operation 30). Specifically, when the reference acceleration of gravity, which corresponds to the acceleration of the electronic device that does not move, is erroneously measured to be greater than 9.8 m/s$^2$ a predetermined number of times, the difference between the sensed acceleration of gravity and the reference acceleration of gravity is determined to be the error between the reference acceleration of gravity and the sensed acceleration of the electronic device.

Next, the predetermined threshold is reset using the detected error of the acceleration of gravity (operation 32). When the reference acceleration of gravity is erroneously sensed to be larger than 9.8 m/s$^2$, the predetermined threshold is increased by the detected error. That is, the predetermined threshold is increased to be proportional to the detected error of the acceleration of gravity.

Figure 7A:
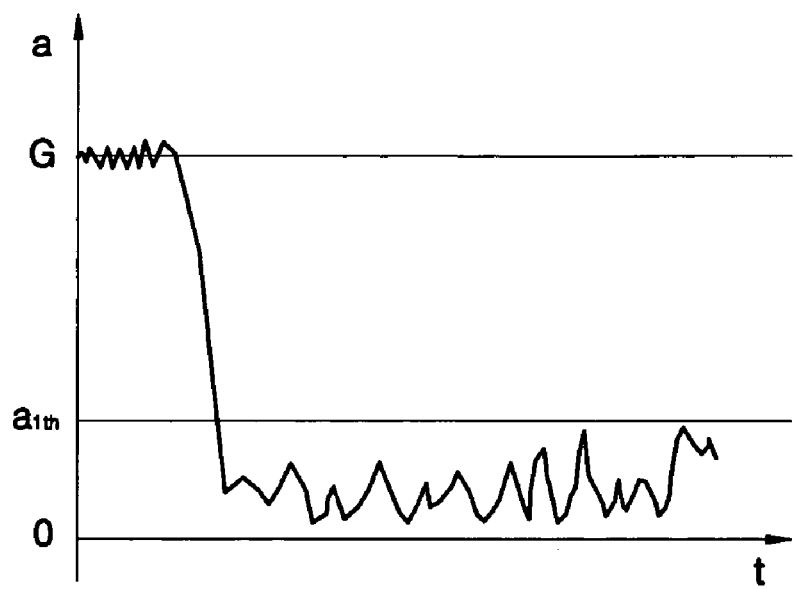
FIGS. 7A and 7B are graphs illustrating operations 30 and 32 of FIG. 6.
Figure 7B:
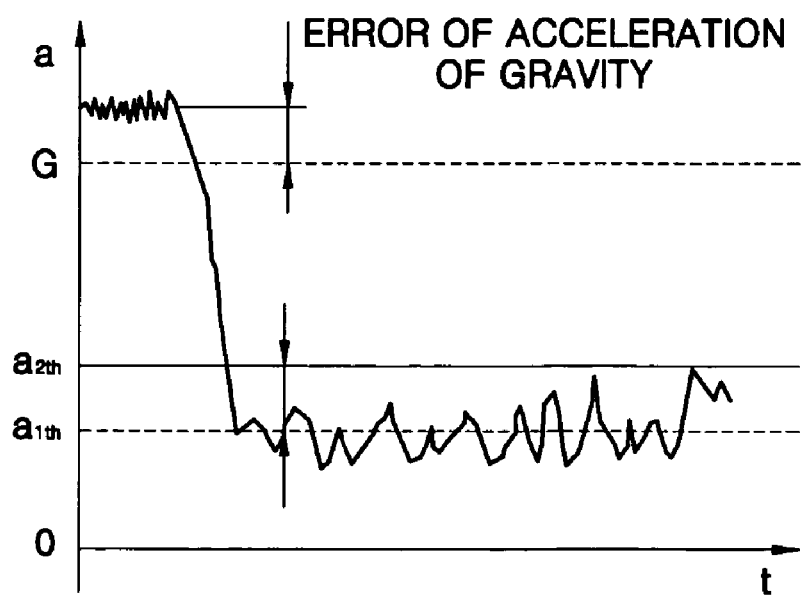

FIGS. 7A and 7B are graphs explaining operations 30 and 32 of FIG. 6. In detail, FIG. 7A illustrates a first threshold $a_{1th}$ determined when the reference acceleration of gravity is sensed to be 9.8 m/s$^2$. FIG. 7B illustrates a second threshold $a_{2th}$ determined when the reference acceleration of gravity is erroneously sensed to be greater than 9.8 m/s$^2$. Referring to FIG. 7B, when the reference acceleration of gravity is sensed to be greater than G=9.8 m/s², an error between the reference acceleration of gravity and the sensed acceleration of gravity is generated, the first threshold $a_{1th}$ is reset to the second threshold $a_{2th}$ by increasing the first threshold $a_{1th}$ by the error.

When the reference acceleration of gravity is sensed to be less than 9.8 m/s², the predetermined threshold $a_{1th}$ is reduced by the error of the acceleration of gravity. That is, the predetermined threshold is reduced to be proportional to the error of the acceleration of gravity.

Accordingly, even if the reference acceleration of gravity is not precisely measured, it is possible to adjust the predetermined threshold $a_{1th}$, which is a reference value used in determining whether the electronic device falls freely, by increasing or reducing the predetermined threshold $a_{1th}$ by the error of the acceleration of gravity.

If the error of the acceleration of gravity is not detected, that is, when an acceleration sensor exactly senses the reference acceleration of gravity of the electronic device that does not move for the predetermined length of time, the first predetermined threshold $a_{1th}$ is maintained as illustrated in FIG. 7A.

Operation 10 is optional to the method of FIG. 4. In other words, the free fall of the electronic device can be determined by performing operations 12 through 18 without operation 10. In this case, the predetermined threshold is used as the reference value in determining whether the electronic device falls freely without resetting the predetermined threshold.

After operation 10, the falling acceleration of the electronic device is sensed using the acceleration sensor (operation 12). The acceleration sensor included in the electronic device continuously senses the falling acceleration of the electronic device to determine whether the electronic device falls freely.

Next, it is determined whether the sensed falling acceleration is less than the predetermined threshold (operation 14). The predetermined threshold may be computed before operation 10 or be reset in operation 10. If the sensed falling acceleration is not less than the predetermined threshold, the method proceeds to operation 10 (or 12) and operations 10 (or 12) through 14 are repeated.

If the sensed falling acceleration is less than the predetermined threshold, it is determined whether the falling acceleration is a statistical constant which has a statistical significance and is maintained for a predetermined time (operation 16). The statistical constant is a value that is not a mathematical constant but changes within the range so that it can be regarded as a constant in a statistical sense.

The reason why the statistical constants are used will now be described. The predetermined threshold calculated before operation 10 or reset in operation 10 is a value, e.g., 0.3*9.8 m/s² or 0.5*9.8 m/s², which is considerably greater than 0. Thus, it is possible to determine whether the electronic device falls freely in consideration of errors such as the drift error of the acceleration sensor and an error caused by the rotation acceleration. However, when the predetermined threshold is greater than 0, the acceleration of the electronic device, which does not fall freely but makes acceleration or vibrates, is very likely to be maintained at a value less than the predetermined threshold for a predetermined time. In this case, it is highly probable that the acceleration sensor would determine that the electronic device falls freely. To prevent this problem, i.e., to distinguish between an acceleration signal generated when the electronic device moves or vibrates and an acceleration signal generated when the electronic device falls freely, the present invention uses statistical constants based on a fact that the acceleration of the electronic device falling freely is a statistical constant which is maintained for a predetermined time.

Methods of determining statistical constants according to exemplary embodiments of the present invention will now be described, but the present invention is not limited to this description. That is, the statistical constants may be determined using various methods.

First, when falling accelerations of the electronic device sensed for a predetermined time are within a predetermined range, the falling accelerations are determined to be statistical constants. If the predetermined time is 300 msec, the predetermined range is from 0.2*9.8 m/s² to 0.6*9.8 m/s², and the falling accelerations sensed for 300 msec are between 0.2*9.8 m/s² and 0.6*9.8 m/s², the falling accelerations are considered as statistical constants.

Second, when a variance or a standard deviation of falling accelerations sensed for a predetermined time is less than or equal to a predetermined value, the falling accelerations are determined to be statistical constants. The variance is a statistical term that refers to the amount of dispersion or spread in a distribution. That is, the variance indicates the degree of the values of variable quantities that deviate from an average value. The statistical deviation refers to a square root of the degree of the values of variable quantities that deviate from an average value. If the predetermined value is 0.1*9.8 m/s² and the variance of the falling accelerations are approximate values to 0.1*9.8 m/s², the falling accelerations are considered as the statistical constants.

Third, when a Chi-square value of falling accelerations of the electronic device sensed for a predetermined time, which is obtained according to a Chi-square test, is less than or equal to a predetermined value, the falling accelerations may be determined to be statistical constants. The Chi-square test is used to determine whether observed frequency is significantly different from expected frequency. A Chi-square value is obtained by setting a null hypothesis of a statistical fact and computing the difference between the substantial frequency and the expected frequency according to the Chi-square test. Next, the null hypothesis is accepted or discarded according to the obtained Chi-square value. If the Chi-square value is a large value, the reliability of the null hypothesis is low. Thus, when the Chi-square value of the falling accelerations approximates the predetermined value, the Chi-square value is considered as a reliable, statistical constant of the falling accelerations.

When the falling acceleration is not maintained at a statistical constant for a predetermined time, the method proceeds to operations 10 (or 12) and operations 10 (or 12) through 16 are repeatedly performed.

When the falling acceleration is maintained at the statistical constant for the predetermined time, it is determined that the electronic device falls freely (operation 18). Specifically, it is determined that the falling acceleration is maintained at the statistical constant for the predetermined time and the electronic device falls freely, when falling accelerations sensed for the predetermined time fall within a predetermined range, a variance or standard deviation of the falling accelerations is less than or equal to a predetermined value, or a Chi-square value of the falling accelerations obtained according to the Chi-square test is less than or equal to a predetermined value. In other words, even if the falling acceleration of the electronic device are not approximately equal to 0, when the falling accelerations are maintained at statistical constants for the predetermined time, the electronic device is considered as falling freely while rotating.

Figure 8:
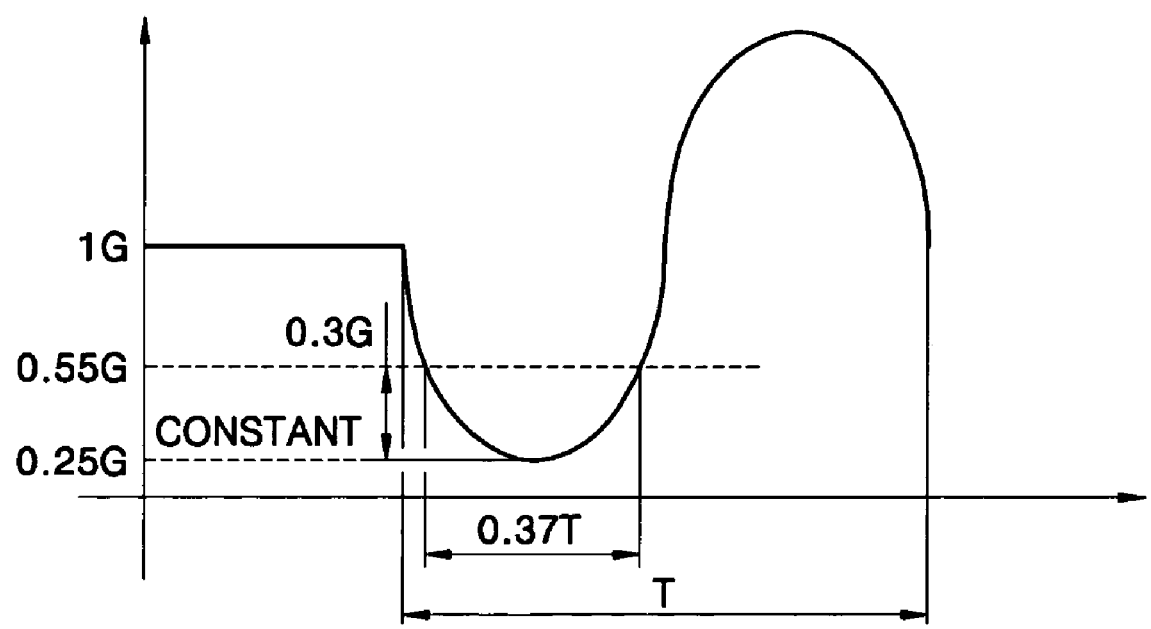
FIG. 8 is a graph of a method of distinguishing between an acceleration signal generated when an electronic device moves in general or vibrates and an acceleration signal generated when the electronic device falls freely, according to an exemplary embodiment of the present invention.

FIG. 8 is a graph illustrating a method of distinguishing between an acceleration signal generated when an electronic device moves or vibrates and an acceleration signal generated when the electronic device falls freely, according to an exemplary embodiment of the present invention. In this embodiment, it is assumed that a predetermined threshold is $0.55*9.8$ m/s$^2$, the range of predetermined threshold for testing statistical constants is from $0.25*9.8$ m/s$^2$ to $0.55*9.8$ m/s$^2$, and the length of reference time required to determine whether the electronic device falls freely is $0.37T=250$ msec. In this case, as illustrated in FIG. 8, when values of an acceleration signal of a sine wave curve, which are measured for $0.37T=250$ msec when the electronic device makes a general (or vibration) movement, fall within a range from $0.25*9.8$ m/s$^2$ to $0.55*9.8$ m/s$^2$, falling accelerations of the electronic device are considered as statistical constants and it is determined that the electronic device falls freely. Accordingly, according to an exemplary embodiment of the present invention, it is possible to prevent a generic movement of the electronic device at a frequency equal to or greater than $f=0.37/0.25 \approx 1.5$ Hz from being determined as a free fall mistakenly. In contrast, conventionally, the movement of the electronic device at frequencies from 1.5 to 5 Hz is very likely to be determined as the free fall.

When the movement of the electronic device is determined as the free fall, a warning sound rings and a shock protection routine is activated.

An apparatus for detecting the free fall of an electronic device according to an exemplary embodiment of the present invention will now be described with reference to the accompanying drawings.

Figure 9:
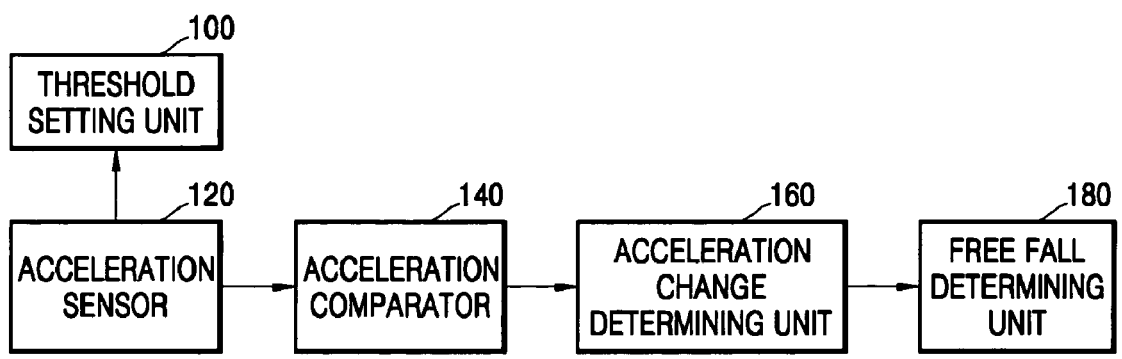
FIG. 9 is a block diagram of an apparatus for detecting a free fall of an electronic device according to an exemplary embodiment of the present invention.

FIG. 9 is a block diagram of an apparatus for detecting the free fall of an electronic device according to an exemplary embodiment of the present invention. The apparatus includes a threshold setting unit 100, an acceleration sensor 120, an acceleration comparator 140, an acceleration change determining unit 160, and a free fall determining unit 180.

The threshold setting unit 100 resets a predetermined threshold to correspond to an error between the reference acceleration of gravity and sensed acceleration of an electronic device.

Before the threshold setting unit 100 resets the predetermined threshold, the predetermined threshold has been computed by compensating for the error of the acceleration of gravity and rotation acceleration generated by the rotation movement of the electronic device. For instance, the reference acceleration of gravity is measured to be greater by $0.2*9.8$ m/s$^2$ than $G=9.8$ m/s$^2$, due to a temperature increase. That is, an error of the acceleration of gravity of $0.2*9.8$ m/s$^2$ is caused. If the electronic device falls freely while rotating, rotation acceleration of about $0.3*9.8$ m/s$^2$ is generated. Thus, the predetermined threshold is preferably determined to be approximately $0.5*9.8$ m/s$^2$ to prevent the free fall of the electronic device from not being sensed due to the error of the acceleration of gravity and the rotation acceleration.

As described above, the threshold setting unit 100 resets the predetermined threshold to be proportional to the error of the acceleration of gravity sensed by the acceleration sensor 120.

Figure 10:
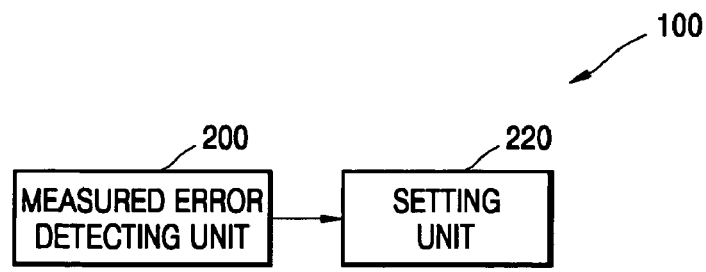
FIG. 10 is a detailed block diagram of a threshold setting unit of FIG. 9.

FIG. 10 is a detailed block diagram of the threshold setting unit 100 of FIG. 9. Referring to FIG. 10, the threshold setting unit 100 includes a measured error detecting unit 200 and a setting unit 220.

The measured error detecting unit 200 receives the reference acceleration of gravity sensed by the acceleration sensor 120, and determines whether the acceleration of gravity is greater or less than 9.8 m/s$^2$. When the sensed acceleration of gravity is greater or less than 9.8 m/s$^2$, the measured error detecting unit 200 computes the difference between the sensed acceleration of gravity and 9.8 m/s$^2$ and transmits the difference, as the error of the acceleration of gravity, to the setting unit 220.

The setting unit 220 receives the error of the acceleration of gravity from the measured error detecting unit 200, and resets the predetermined threshold according to the error of the acceleration of gravity. For instance, when the sensed acceleration of gravity is greater than $G=9.8$ m/s$^2$ and the error between the reference acceleration of gravity and the sensed acceleration of gravity is output from the measured error detecting unit 200, the setting unit 220 increases the predetermined threshold to be proportional to the error. FIGS. 7A and 7B are graphs explaining the operation of the threshold determining unit 220 of FIG. 10. Specifically, FIG. 7A illustrates a predetermined threshold a$_{th}$ determined when the sensed acceleration of gravity is 9.8 m/s$^2$, and FIG. 7B illustrates a predetermined threshold a$_{2th}$ determined when the sensed acceleration of gravity is greater than 9.8 m/s$^2$. Referring to FIG. 7B, when the sensed acceleration of gravity is greater than 9.8 m/s$^2$, an error between the sensed acceleration of gravity and the reference acceleration of gravity is generated, and the predetermined threshold a$_{1th}$ is reset to the predetermined threshold a$_{2th}$ to compensate for the error.

If the sensed acceleration of gravity is less than $G=9.8$ m/s$^2$, the setting unit 220 reduces the predetermined threshold by the error of the acceleration of gravity.

The threshold setting unit 100 is not an indispensable element of the apparatus of FIG. 9, that is, the threshold setting unit 100 is optional. If the threshold setting unit 100 is not included in the apparatus, the predetermined threshold is used in determining whether the electronic device falls freely without resetting the predetermined threshold.

The acceleration sensor 120 periodically senses the acceleration of gravity or falling acceleration of the electronic device, and transmits the result of sensing to the threshold setting unit 100 and the acceleration comparator 140.

The acceleration comparator 140 compares whether the falling acceleration of the electronic device is less than the predetermined threshold. Specifically, when receiving the falling acceleration of the electronic device from the acceleration sensor 120, the acceleration comparator 140 compares whether the falling acceleration is less than the predetermined threshold or the threshold reset by the threshold setting unit 100, and transmits the result of comparison to the acceleration change determining unit 160.

In response to the result of comparison, the acceleration change determining unit 160 determines whether the falling acceleration is a statistical constant that is maintained for a predetermined time and outputs the result of determination to the free fall determining unit 180.

As described above, the statistical constant is a value changing within the range of statistical constants, which is not a mathematical constant that does not change.

The acceleration change determining unit 160 determines the falling acceleration as a statistical constant when the falling acceleration changes within a predetermined range for the predetermined time. When the acceleration change determining unit 160 senses that the falling accelerations sensed for 300 msec are between $0.2*9.8$ m/s$^2$ and $0.6*9.8$ m/s$^2$ on an assumption that the predetermined time is 300 msec and the predetermined range is from $0.2*9.8$ m/s$^2$ to $0.6*9.8$ m/s$^2$, the acceleration change determining unit 160 determines the falling accelerations as statistical constants.

Alternatively, the acceleration change determining unit 160 may determine the falling accelerations as the statistical constants when a variance of the falling accelerations sensed for a predetermined time is less than or equal to a predetermined value. For instance, when the predetermined value corresponds to $0.1*9.8$ m/s$^2$ and the variance approximates $0.1*9.8$ m/s$^2$, the acceleration change determining unit 160 determines the falling accelerations as the statistical constants.

Alternatively, the acceleration change determining unit 160 may determine the falling acceleration sensed for a predetermined time as the statistical constants when a Chi-square value of the falling accelerations obtained according to the Chi-square test is less than or equal to a predetermined number. That is, when the Chi-square value approximates the predetermined value, the acceleration change determining unit 160 considers the Chi-square value as a reliable statistical constant.

However, a method of determining whether the falling accelerations are statistical constants, using the acceleration change determining unit 160, is not limited to the above description. That is, various methods may be used according to an exemplary embodiment of the present invention.

The free fall determining unit 180 determines whether the electronic device falls freely according to the result of determination transmitted from the acceleration change determining unit 160. Specifically, the free fall determining unit 180 determines that the electronic device falls freely while rotating when the falling accelerations, which are sensed by the acceleration change determining unit 160 for a predetermined time, fall within a predetermined range; the variance of the sensed falling accelerations is less than or equal to a predetermined value; or a Chi-square value of the sensed falling accelerations obtained according to the Chi-square test is less than or equal to a predetermined number. When the electronic device is determined to fall freely, a warning sound rings and a shock protection routine is activated.

As described above, according to a method and apparatus for detecting a free fall of an electronic device according to exemplary embodiments of the present invention, it is possible to exactly detect a free fall of an electronic device irrespective of an error of acceleration of gravity, which is generated when a falling acceleration of the electronic device is measured, due to ambient conditions, e.g., a temperature change.

According to exemplary embodiments of the present invention, it is possible to prevent a free fall of an electronic device from being ignored due to rotation acceleration generated when the electronic device falls freely while rotating.

Further, exemplary embodiments of the present invention use statistical constants in determining whether falling accelerations of the electronic device are statistical constants, and thus, it is possible to exactly detect a free fall of an electronic device irrespective of an error of acceleration of gravity sensed by an acceleration sensor and distinguish between the free fall and a general (or vibration) movement of the electronic device.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of detecting a free fall of an electronic device, comprising:
    (a) sensing a falling acceleration of the electronic device using an acceleration sensor;
    (b) determining whether the sensed falling acceleration is less than a predetermined threshold;
    (c) if the sensed falling acceleration is less than the predetermined threshold, determining whether the falling acceleration is a statistical constant, which has a statistical significance, and is maintained for a predetermined time; and
    (d) if the falling acceleration is the statistical constant and maintained for the predetermined time, determining that the electronic device falls freely.

2. The method of claim 1, wherein the predetermined threshold is obtained by compensating for an error between a reference acceleration of gravity and a sensed acceleration of gravity, and a rotation acceleration of the electronic device generated when the electronic device rotates.

3. The method of claim 1, further comprising operation (e) resetting the predetermined threshold to correspond to an error of acceleration of gravity, and proceeding to the operation (a).

4. The method of claim 3, wherein the operation (e) comprises:
    detecting the error of acceleration of gravity; and
    resetting the predetermined threshold using the detected error of acceleration of gravity.

5. The method of claim 1, wherein during the operation (c), the sensed falling acceleration is determined as the statistical constant if the sensed falling acceleration changes within a predetermined range and is maintained for the predetermined time.

6. The method of claim 1, wherein during the operation (c), the sensed falling acceleration is determined as the statistical constant when a variance of the falling acceleration changing for the predetermined time is less than or equal to a predetermined value.

7. The method of claim 1, wherein during the operation (c), the sensed falling acceleration is determined as the statistical constant when a Chi-square value of the falling acceleration sensed for the predetermined time is less than or equal to a predetermined value, the Chi-square value being obtained according to a Chi-square test.

8. An apparatus for detecting a free fall of an electronic device, comprising:
    an acceleration sensor which senses a falling acceleration of the electronic device;
    an acceleration comparator which determines whether the falling acceleration is less than a predetermined threshold;
    an acceleration change determining unit which determines whether the falling acceleration is a statistical constant, which has a statistical significance, and is maintained for a predetermined time, according to the result of a first determination result transmitted from the acceleration comparator; and
    a free fall determining unit which determines that the electronic device falls freely if a second determination result indicates that the falling acceleration is the statistical constant and is maintained for the predetermined time, wherein said second result is transmitted from the acceleration change determining unit.

9. The apparatus of claim 8, wherein the predetermined threshold is obtained by compensating for an error between a reference acceleration of gravity and a sensed acceleration of gravity, and a rotation acceleration generated when the electronic device rotates.

10. The apparatus of claim 8, further comprising a threshold setting unit which resets the predetermined threshold to correspond to an error of acceleration of gravity.

11. The apparatus of claim 10, wherein the threshold setting unit comprises:
   a measured error detecting unit which detects the error of acceleration of gravity; and
   a setting unit which resets the predetermined threshold according to the error of acceleration of gravity.

12. The apparatus of claim 8, wherein the acceleration change determining unit determines the sensed falling acceleration as the statistical constant if the falling acceleration sensed for the predetermined time is maintained within a predetermined range.

13. The apparatus of claim 8, wherein the acceleration change determining unit determines the sensed falling acceleration as the statistical constant if a variance of the falling acceleration sensed for the predetermined time is less than or equal to a predetermined number.

14. The apparatus of claim 8, wherein the acceleration change determining unit determines the sensed falling acceleration as the statistical constant when a Chi-square value of the falling acceleration sensed for the predetermined time is less than or equal to a predetermined value.

* * * * *